(12) United States Patent
Bhat et al.

(10) Patent No.: US 8,175,623 B2
(45) Date of Patent: May 8, 2012

(54) PLATFORM FOR MANAGING MOBILE DOMAINS AND KEYWORD-ACTIVATED APPLICATIONS

(75) Inventors: Shailesh Bhat, Bangalore (IN); Shouvick Mukherjee, Bangalore (IN); Subramanya Sharma, Bangalore (IN); Navin Doshi, Bangalore (IN); Mekin Maheshwari, Bangalore (IN); Anoop Jain, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 775 days.

(21) Appl. No.: 11/468,645

(22) Filed: Aug. 30, 2006

(65) Prior Publication Data

US 2007/0293247 A1    Dec. 20, 2007

(30) Foreign Application Priority Data

Jun. 14, 2006   (IN) .............................. 587/KOL/2006

(51) Int. Cl.
*H04W 4/00* (2009.01)
(52) U.S. Cl. .................. 455/466; 455/414.1; 455/556.1; 455/405; 455/412.1; 705/34; 705/45
(58) Field of Classification Search .................. 455/466, 455/406, 410, 414.1, 414.3, 418, 405, 412.1, 455/556.1; 705/34, 45
See application file for complete search history.

(56) References Cited

U.S. PATENT DOCUMENTS

| | | | |
|---|---|---|---|
| 5,758,088 A | 5/1998 | Bezaire et al. | |
| 6,021,433 A | 2/2000 | Payne et al. | |
| 6,167,426 A | 12/2000 | Payne et al. | |
| 6,381,594 B1* | 4/2002 | Eichstaedt et al. ................ | 707/3 |
| 6,735,614 B1 | 5/2004 | Payne et al. | |
| 2002/0119789 A1* | 8/2002 | Friedman ...................... | 455/456 |
| 2003/0141361 A1* | 7/2003 | Nguyen et al. ................ | 235/380 |
| 2004/0023644 A1* | 2/2004 | Montemer .................. | 455/414.1 |
| 2005/0003837 A1* | 1/2005 | Midkiff et al. ................ | 455/466 |
| 2005/0136949 A1 | 6/2005 | Barnes | |
| 2005/0222900 A1* | 10/2005 | Fuloria et al. ................... | 705/14 |
| 2005/0228797 A1* | 10/2005 | Koningstein et al. ......... | 707/100 |
| 2005/0245241 A1 | 11/2005 | Durand et al. | |

FOREIGN PATENT DOCUMENTS

GB     2420888 A     6/2006

OTHER PUBLICATIONS

Official Communication for European Patent Application No. 07756759.2, mailed Feb. 24, 2011.
Official Communication for Chinese Patent Application No. 200780022199.6, mailed Oct. 13, 2010.
Official Communication for Korean Patent Application No. 10-2008-7032044, mailed Sep. 1, 2010.

* cited by examiner

*Primary Examiner* — Nick Corsaro
*Assistant Examiner* — Quan Hua
(74) *Attorney, Agent, or Firm* — Frommer Lawrence & Haug LLP; Jamie L. Wiegand (57) ABSTRACT

A mobile domain platform for subscribers (e.g. businesses, institutions, advertising agencies, partners, providers, individuals, and enterprises) to offer a text message based campaign to new or potential customers (users). A subscriber can create a mobile domain by selecting and registering at least one available keyword with a mobile domain platform for the subsequent processing of text messages sent to the platform which include one or more of the registered keywords. Also, the subscriber can register one or more keywords as a root for a mobile domain such that subsequent text messages sent to the mobile domain platform that include additional alphanumeric strings of text (root keyword plus one or more combinations of other predetermined keywords) can be automatically processed to enable one or more different actions. A mobile domain keyword is generally composed of one or more alphanumeric characters, and can be any one of a word, phrase, abbreviation, or character.

38 Claims, 8 Drawing Sheets

PLATFORM FOR MANAGING MOBILE DOMAINS AND KEYWORD-ACTIVATED APPLICATIONS

CROSS-REFERENCE TO RELATED APPLICATIONS

This application claims the benefit of Indian Application Serial No. 587/KOL/2006 filed on Jun. 14, 2006, which is hereby incorporated by reference.

FIELD OF THE INVENTION

This invention relates to mobile device communication, and more particularly, it relates to enabling a subscriber to manage user interaction with a mobile domain based on at least one text message keyword.

BACKGROUND OF THE INVENTION

In today's global society, businesses often operate all day, every day to provide consumers with access to their offerings. Recent advances in technology has provided consumers with considerable flexibility in where and how they shop for products and services. For example, consumers and businesses can communicate by wired or wireless telephones (voice), websites, emails, text messages, instant messaging, faxes, and the like. Also, many consumers often employ keyword online search engines to research information regarding products and services of interest. The results of these searches typically generate listings of relevant product/service information, such as models, pricing, store locations, reviews, and vendors. Additionally, most search engine companies enable online vendors to pay for prominent placement in the search results for a particular key word.

Many larger and midsize businesses offer access over the Internet to an online website or portal regarding the services and goods that they offer, e.g., www.xyzcompany.com. Although many smaller businesses sell products and services to customers that often access information online, these small businesses typically can not afford to maintain an online presence. However, small businesses are often accessible to their customers by one or more means of communication, such as wired and/or wireless telephones, faxes, text messaging, and the like.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

DETAILED DESCRIPTION OF THE INVENTION

The invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the invention may be embodied as methods, processes, systems, business methods, or devices. Accordingly, the present invention may take the form of an entirely hardware embodiment, an entirely software embodiment or an embodiment combining software and hardware aspects. The following detailed description is, therefore, not to be taken in a limiting sense.

The invention is generally directed to a method and system for providing a mobile domain platform for subscribers (e.g. businesses, institutions, advertising agencies, partners, providers, individuals, enterprises, and the like) to offer a text message based campaign to new or potential customers (users). A subscriber can create a mobile domain by selecting and registering at least one available keyword with a mobile domain platform for the subsequent processing of text messages sent to the platform which include one or more of the registered keywords. Also, the subscriber can register one or more keywords as a root for a mobile domain such that subsequent text messages sent to the mobile domain platform that include additional alphanumeric strings of text (root keyword plus one or more combinations of other predetermined keywords) can be automatically processed to enable one or more different actions. A mobile domain keyword is generally composed of one or more alphanumeric characters, and can be any one of a word, phrase, abbreviation, character, and the like.

The mobile domain platform enables the subscriber to define rules, events, and/or conditions for one or more defined applications to process a text message sent to a mobile number that corresponds to the platform and the message includes one or more of the registered keywords. The processing of the text message keyword is generally defined by the subscriber, but it can also be performed in accordance with one or more default rules provided by the mobile domain platform.

Examples of application processing can include aggregating answers in text messages for a poll created by a subscriber, or identifying one of a plurality of subscribers that provided the mobile domain platform with the best bid for registering a popular keyword, e.g., "pizza". One or more delivery actions are identified in advance by the subscriber for each application that corresponds to one or more registered keywords included in the received text message. Examples of these delivery actions can include providing the user's information to the subscriber by one or more of email, fax, alert, daily digest, Really Simple Syndication (RSS) feed, telephone call, File Transfer Protocol (FTP), Short Message Service (SMS), Multimedia Message Service (MMS), chat, web page update, and the like. Each delivery action can be separately configured by the subscriber based on different factors, such as priority and criticality. Also, the delivery action can be provided by the mobile domain platform to the subscriber at different price points based on different factors, such as quantity, geography, pricing plans, time, date, holidays, sales promotions, weather, and the like.

For example, if a subscriber is currently registered for control of the keyword "pizza" as a root, text messages to the mobile domain platform that include the phrase "pizza buy" might be automatically delivered in real time to the subscriber's customer service personnel by one or more delivery actions as a high priority sales lead. In contrast, a text message that included the phrase "pizza address" could be periodically processed in a batch mode and delivered to the subscriber's customer service personnel by a relatively low cost delivery mechanism as an hourly or daily digest of information inquiries.

Also, the subscriber can gain control of the registration of a keyword for a mobile domain in one or more ways. For example, in one embodiment, several subscribers could bid for control of each instance of a text message received by the mobile domain platform that contained a highly popular and relatively generic keyword, such as "pizza". In this way, the received text message would then be processed according to the application(s) and delivery action(s) prearranged by the highest bidding subscriber with the mobile domain platform. In other embodiments, the subscriber could bid for exclusive control over a period of time, e.g., days, months, and the like, for all text messages that include a particular keyword associated with a campaign, such as a poll, advertisement, request fulfillment, and the like.

In still another embodiment, the subscriber could dynamically bid on registering an available keyword with a predetermined amount of funds over specific periods of time. For example, the subscriber could provide $10,000 to the platform to dynamically bid on a particular keyword over a period of one month with the further limitation that no more than $334 could be spent in one day and this amount could only be spent during particular days and hours, such as the days and hours that the subscriber is open for business.

Additionally, if it is brought to the attention of an operator of a mobile domain platform that a particular keyword is also a trademark of a potential or existing subscriber, the operator can choose to only make that keyword available to the trademark holder for registration with the mobile domain platform.

In at least one embodiment, the text message with the registered keyword is sent via a short code mobile number that corresponds to the mobile domain platform. A short code mobile number typically includes four or five digits, e.g., 8243 or 92466. Also, a user can send a text message to the short code mobile number that corresponds to the mobile domain platform from a wireless/mobile device or a wired device, such as a personal computer. However, the mobile domain platform is not so limited, because it can also be arranged to process text messages received from a non-short code mobile number, email address, Instant Messaging (IM) handle, Really Simple Syndication (RSS) feed, File Transfer Protocol (FTP), Short Message Service (SMS), Multimedia Message Service (MMS), chat, and the like. Generally, the mobile domain platform can be arranged to process received text messages that include a mobile domain keyword(s) with one or more applications, interactions and delivery actions that are predefined by the subscriber that is currently registered with the platform to control that particular keyword(s).

In one exemplary embodiment, the user could send a text message that includes mobile domain keyword "pizza buy" to the short code mobile number "8243". The mobile domain platform would process the text message and deliver in real time its contents and user information to the current registered subscriber to the "pizza" mobile domain keyword. In a somewhat similar way, in response to a text message that includes the keyword "poll", the mobile domain platform could enable a previously defined application to process the message and aggregate its contents with the contents of other text messages that also included the mobile domain keyword "poll". These aggregated results would be subsequently delivered in a predetermined manner to the subscriber that currently controlled the registration of the keyword "poll".

In one embodiment, the mobile domain keyword and a short code mobile number information is provided in a listing along with other results for an online search. In part because this information can be provided as an online search result, subscribers with no interactive online presence can gain access to those users that do have an online capability. In another embodiment, this mobile domain keyword and short mobile code number information can be made available in a printed publication, such as newspaper, magazine, book, flyer, or advertisement. In still other embodiments, this information can be communicated to customers/users through a video display, movie, picture, or an announcement. Furthermore, listed directly below is an exemplary listing for a mobile domain keyword and short code mobile number information that could be provided to the user.

"To get an application for this legal internship job send a text message with 'Apply law' to 8243."

In one embodiment, the listing of keyword and short code information can be provide by a subscriber in a printed publication, and in another embodiment the mobile domain platform can enable this information to be included in the results for a user's online search for a programmer job.

Illustrative Operating Environment

Figure 1:
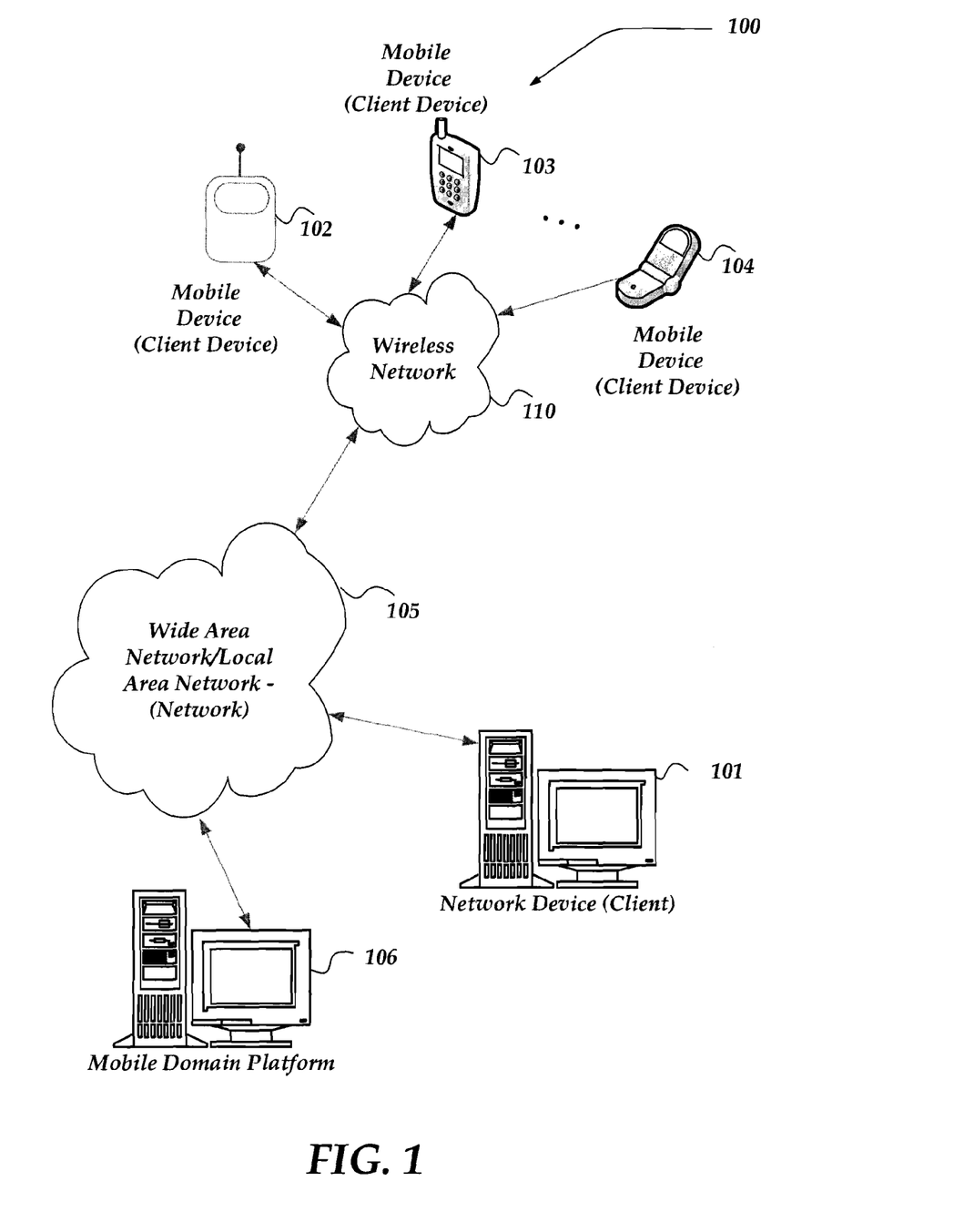
FIG. 1 shows an illustrative operating environment.

FIG. 1 shows components of one embodiment of a network environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")-(network) 105, wireless network 110, Mobile Domain platform 106, mobile devices (client devices) 102-104, and client network device 101.

One embodiment of mobile devices 102-103 is described in more detail below in conjunction with FIG. 2. Generally, however, mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to mobile domain platform 106, client network device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as mobile domain platform 106, client network device 101, or the like. However, the present invention is not limited to these message protocols, and virtually any other message protocol may be employed.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Mobile devices 102-104 may further be configured to include a client application that enables the end-user to log into an end-user account that may be managed by another computing device, such as mobile domain platform 106. Such end-user account, for example, may be configured to enable the end-user to receive emails, send/receive IM messages, SMS messages, access selected web pages, or the like.

Client network device 101 may include virtually any computing device capable of communicating over a network to send and receive information, or the like. The set of such devices may include devices that typically connect using a wired or wireless communications medium such as personal computers, multiprocessor systems, wearable computers, microprocessor-based or programmable consumer electronics, network PCs, or the like.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation, $4^{th}$ (4G) generation, $5^{th}$ (5G) generation, radio access for cellular systems, WLAN, WiMax, Wireless Router (WR) mesh, and the like. Access technologies such as 2G, 3G, 4G, 5G, and future access networks may enable wide area coverage for mobile devices, such as mobile devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA 2000, Universal Mobile Telecommunication Service (UMTS), and the like. In essence, wireless network 110 may include virtually any wireless communication mechanism by which information may travel between mobile device s 102-104 and another computing device, network, and the like.

Network 105 is configured to couple mobile domain platform 106 and its components with other computing devices, including, mobile devices 102-104, client network device 101, and through wireless network 110 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between mobile platform 106, client network device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of mobile computing platform 106 is described in more detail below in conjunction with FIG. 4.

Briefly, however, mobile computing platform 106 may include any computing device capable of connecting to network 105 to enable communication with mobile devices 102-104 and client network device 101.

Computing devices that may enable mobile computing platform 106 include personal computers desktop computers, multiprocessor systems, microprocessor-based or programmable consumer electronics, network PCs, servers, network devices, and the like.

Figure 3:
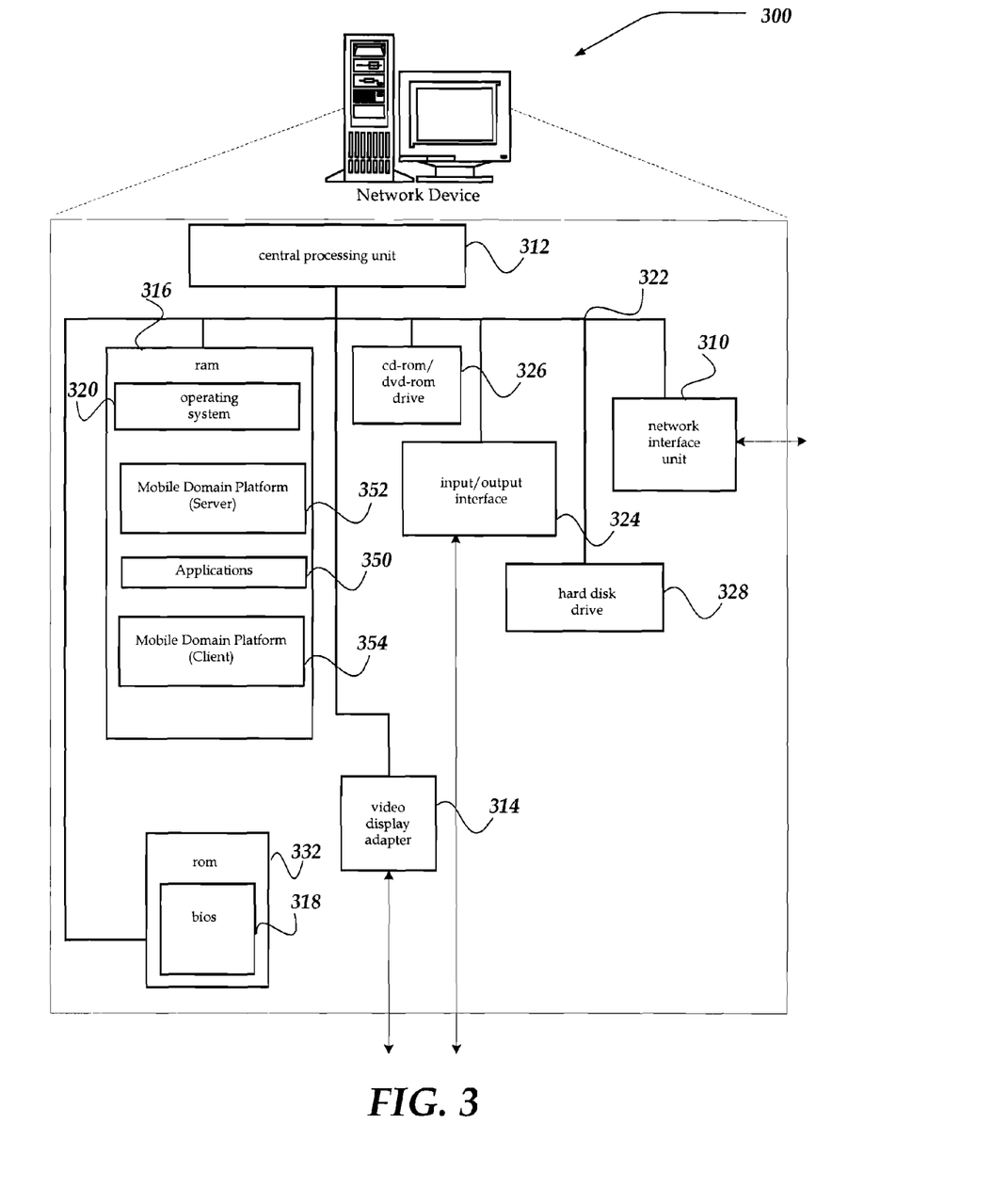
FIG. 3 shows one embodiment of a network device.

Although FIG. 1 illustrates mobile computing platform 106 as a single computing device, the invention is not so limited. For example, one or more functions of platform 106 may be distributed across one or more distinct network devices as illustrated in FIG. 3.

Illustrative Mobile Device

Figure 2:
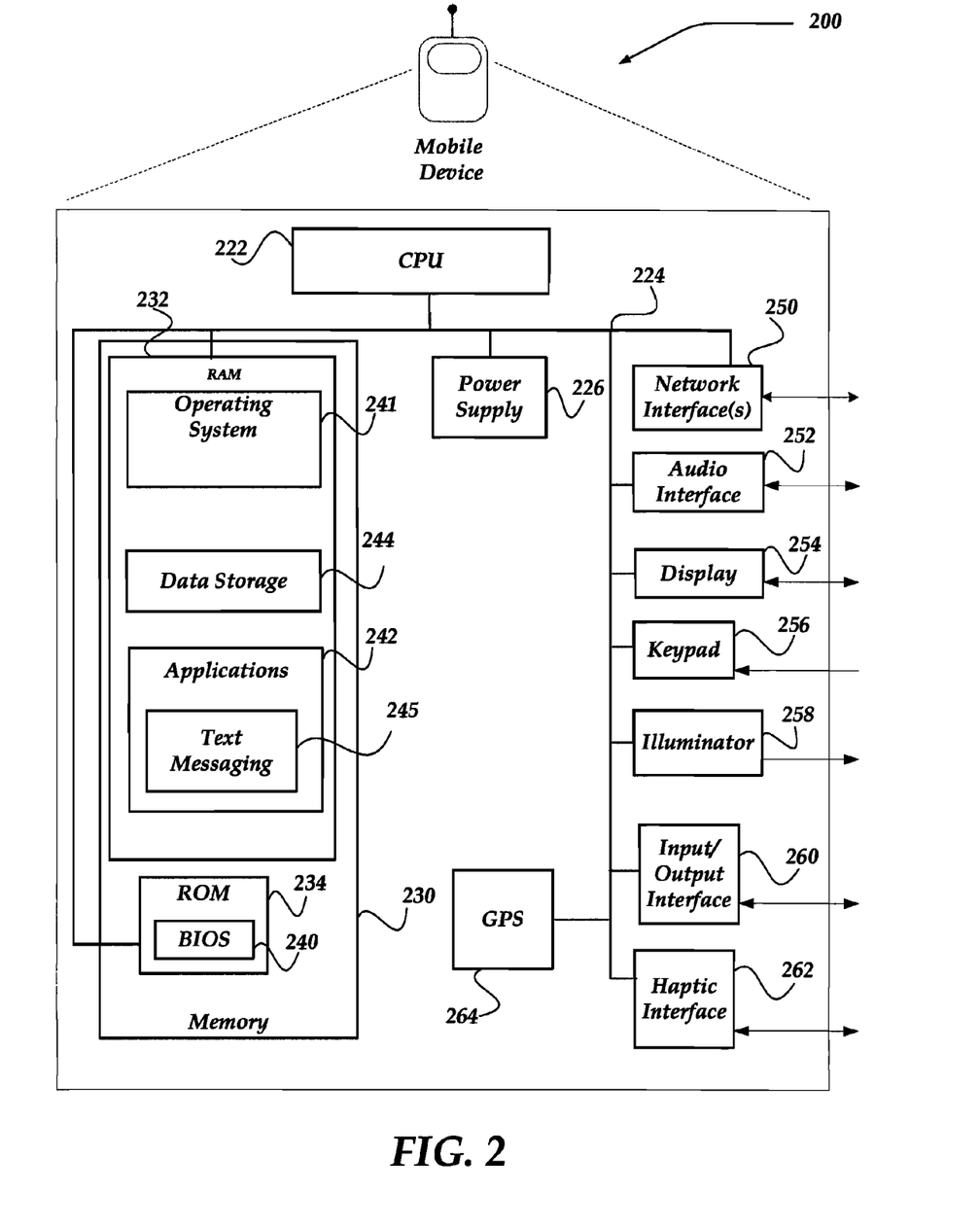
FIG. 2 shows one embodiment of a mobile device.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, mobile devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. For example, data storage 244 may also be employed to store information that describes various capabilities of mobile device 200. The information may then be provided to another device based on any of a variety of events, including being sent as part of a header during a communication, sent upon request, or the like.

Applications 242 may include computer executable instructions which, when executed by mobile device 200, transmit, receive, and/or otherwise process text messages, audio, video, and enable telecommunication with another user of another client device. Other examples of application programs include calendars, browsers, VOIP applications, contact managers, task managers, transcoders, database programs, word processing programs, security applications, spreadsheet programs, games, search programs, and so forth. Also, text messaging application 245 may include components for enabling one or more messaging applications, including, but not limited to, Short Message Service (SMS), Multimedia Message Service (MMS), instant messaging (IM), internet relay chat (IRC), Mardam-Bey's IRC (mIRC), Jabber, Alerts, and the like.

Illustrative Network Device

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, client network device 101 and/or mobile domain platform 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, Virtual Private Network (VPN) programs, SMS message servers, IM message servers, email servers, account management and so forth. In one embodiment, network device 300 includes server mobile domain platform 352 which is arranged to be operable with one or more of its components included on two or more network devices in a somewhat similar manner as mobile domain platform 106 in FIG. 1. Also, in another embodiment, client mobile domain platform 354 may be arranged as an application program for client network device 101 as shown in FIG. 1.

Illustrative Mobile Domain Platform

Figure 4:
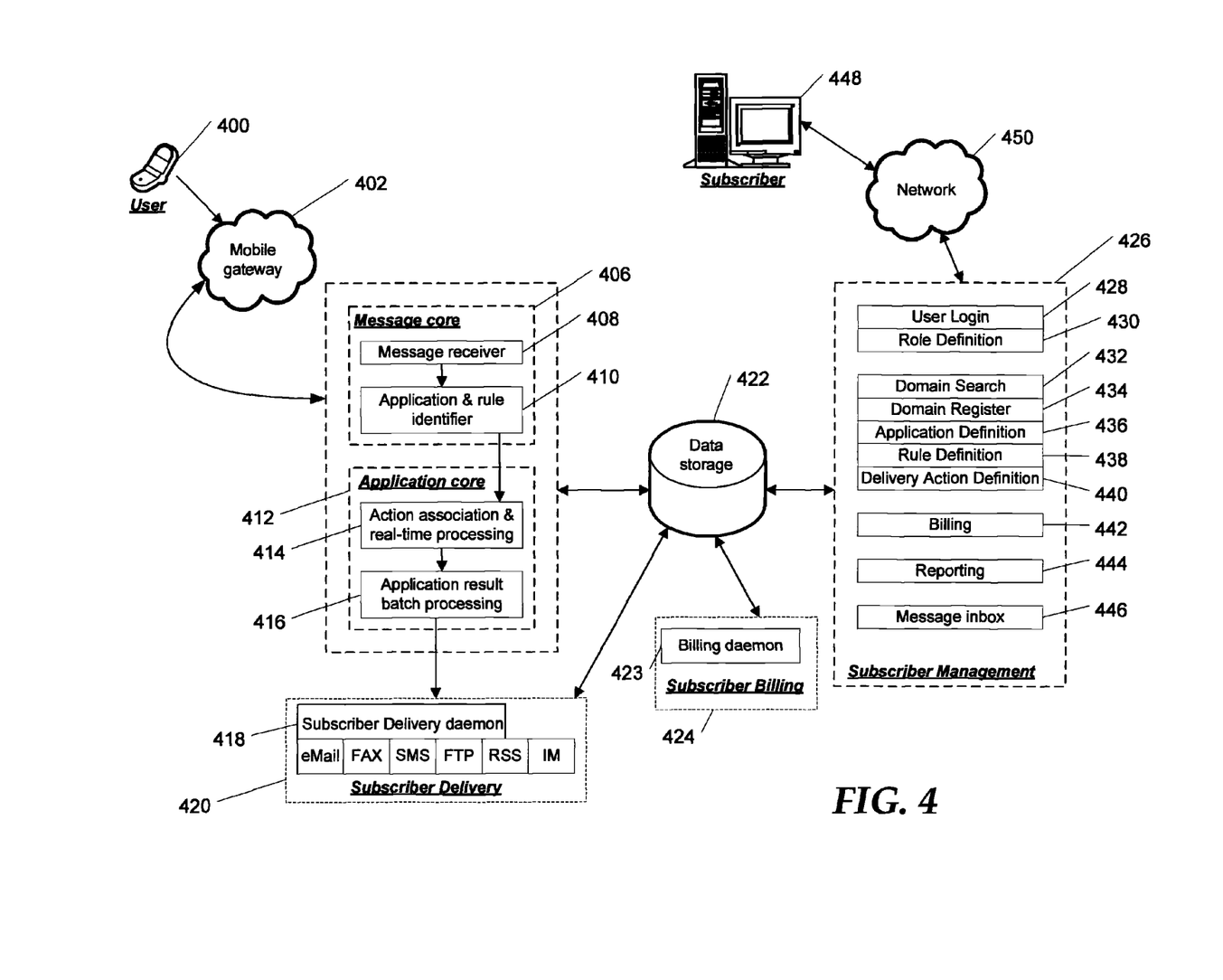
FIG. 4 is a block diagram showing an overview of a mobile domain platform.

FIG. 4 illustrates a block schematic of an exemplary mobile domain platform which is arranged with at least five primary components that include at least one subcomponent, these five components include: message core 406, application core 412, subscriber delivery 420, billing subsystem 424, and subscriber management 426. This five components are arranged to receive and process text messages from the user that are sent to a mobile number (short code or otherwise) that corresponds to the mobile domain platform. The processed content of a received text message is forwarded to a subscriber that has registered at least one keyword that is included in the text message. Generally, the mobile domain platform is arranged for a plurality of subscribers and a plurality of users to simultaneously perform actions with the mobile domain platform. Furthermore, operations of each of the major components of the mobile domain platform are described in greater detail below.

Message core 406 is a primary component arranged to receive a text message at message receiver 408 that was sent by user 400 via mobile network gateway 402 to a mobile number that corresponds to the mobile domain platform. Message receiver 406 is a subcomponent that is arranged to receive the text message and perform one or more operations, including but not limited to, parsing, filtering, and evaluating a hierarchy of keywords vis-á-vis the message's content. Receiver 406 tokenize the message contents and validates the tokenized contents if it is determined that a subscriber is registered for control of a keyword(s) included in the message. The validated and tokenized content is passed to another subcomponent 410 where subscriber predefined rules and/or applications are identified for the received message. Also, message core 406 facilitates caching of campaigns defined by the subscribers, keyword hierarchies, and other actions that generally speed up processing of received messages. Furthermore, message core 406 can enable the mobile domain platform to provide a response in the form of a text message that is sent to user 400, and the content of the response message is based at least in part on the content of the text message originally received from the user.

Application core 412 is another primary component which is arranged to process the subscriber's predefined applications and rules for a campaign that corresponds to the validated and tokenized keyword(s) in the received text message. Generally, application core 412 provides a generic framework for a subscriber to plug in updated interactions, applications, and/or delivery actions for existing or new campaigns without having to make additional changes to the operation of the mobile domain platform.

Additionally, the subscriber can employ an API and/or platform Specification to create at least one of a custom application for processing the content of a received text message or a custom delivery action to the subscriber for the processed result. Application core 412 can process these subscriber updates, customized applications and/or customized delivery actions even if they are provided in one or more different ways including, but not limited to, XML, API instructions, Extensible Stylesheet Language Transformation (XSLT), and the like.

For application core 412, subcomponent 414 enables the performance of associated actions, applications, interactions, and at least a portion of the real time processing of the content of the received text message. Subcomponent 416 enables batch and bulk processing based on time and/or quantum, which can also be dependent on the delivery actions previously selected by the subscriber. Furthermore, application core 412 prepares the text message content for delivery by one or more methods to the subscriber.

Subscriber delivery component 420 is in communication with application core component 412, and is arranged to receive the prepared content of one or more text messages that are identified for delivery to the subscriber. Delivery daemon 418 is a subcomponent that is arranged to manage a plurality of adapters that are arranged to deliver the text message content to the subscriber. These adapters include further subcomponents for delivery mechanisms, including, but not limited to, email, fax, SMS, MMS, FTP, IM, RSS, updated information on a Web page, and the like. Subscriber delivery component 420 enables one or more queues for each delivery mechanism, and can arrange for timeliness of the delivery based on different factors, including, but not limited to priority and criticality. Subscriber delivery component 420 also collect information regarding delivery including a log, status, usage, and/or metrics, which can all be used to enable determination of costs incurred in delivering the text message content to a particular subscriber. Furthermore, subscriber delivery component 420 supports at least one API that enables a subscriber to update new or existing delivery channels without having to make additional changes to the operation of the mobile domain platform.

Subscriber Billing component 424 is arranged to resolve the account balances for subscribers, based at least in part payments made, expenses incurred to process and forward text message content, billing plans, discounts, and the like. Component 424 can support a plurality of billing plans, including, but not limited to, flat rate, number of subscriber applications that are hosted, geography, number of received text messages processed for the subscriber. Also, different costs can be accrued for different delivery actions, including, but not limited to, fax, email, alert, SMS, MMS, RSS, web page updates, and the like. Subscriber Billing Component 424 employs at least one subcomponent, such as billing daemon subcomponent 423, to enable real time and/or batch processing of account balances. Additionally, component 424 can direct an alert, message, and the like, to be provided to a subscriber if a prepaid retainer is running low, and/or a predetermined account balance has been reached.

Subscriber Management component 426 is arranged to communicate over network 450 with at least one subscriber 448, e.g., producers, partners, advertising agencies, businesses, and the like. Network 450 can be arranged to include one or more of the networks described in regard to FIG. 1 above. Also, component 426 can enable one or more user interfaces, including, but not limited to, a web interface, command line interface, and the like.

User login subcomponent 428 is arranged to at least enable a subscriber to access the mobile domain platform and provide authentication of the subscriber. Role definition subcomponent 430 is also arranged at least in part to administer account privileges and roles for each authenticated subscriber. A profile of each subscriber is typically developed and maintained for subscriber management purposes. Domain search subcomponent 432 is further arranged so that the subscriber can search for keywords that available for the subscriber to control. Domain registration subcomponent 434 is operable to enable the subscriber to register for control of at least one selected keyword as a mobile domain that can be controlled for the benefit of the subscriber. Application definition subcomponent 436 is also operable to enable the subscriber to define one or more applications that are hosted by the mobile domain platform for the processing of received text messages whose content includes one or more keywords controlled/registered to the subscriber. Rule definition subcomponent 438 is further operable to enable the subscriber to define one or more rules to be applied in the processing of received text messages. Additionally, it is understood that the rules and applications are typically defined by the subscriber based at least in part on the type of campaign, such as polls, contests, sales leads, loyalty incentives for known users, and digital coupons to new or existing users.

Delivery action definition subcomponent 440 is arranged to enable the subscriber to define the delivery mechanisms discussed above for received text messages, based at least in part on priority, type of campaign, and the like. Billing subcomponent 442 is further arranged to provide financial information to the subscriber, such as billing plans, account expense summaries, and the like. Also, at least some of this financial information is preprocessed by subscriber billing component 424 for subcomponent 442.

Reporting subcomponent 444 is also arranged to provide at least one report to the subscriber regarding at least one campaign, such as relevant evaluations and general effectiveness of different aspects of applications, rules, and/or delivery actions. Furthermore, subcomponent 444 can be arranged to provide reports in real time, periodic, and/or batch during an ongoing campaign to a subscriber. Based at least in part on the report information, a subscriber is enabled to modify an ongoing campaign. For example, if a particular sub-domain keyword, application, rule, and/or delivery action is identified by the report as more popular with users in one or more campaigns, the subscriber is enabled to subsequently modify at least one ongoing campaign to promote at least one popular feature.

Message inbox subcomponent 446 is further arranged to manage text messages communicated between the subscriber and the mobile domain platform.

Additionally, data store 422 enables each component to store and access one or more databases to enable the management, billing, and processing of communication between users of and subscribers to the mobile domain platform.

Illustrative Flow Charts

Figure 5:
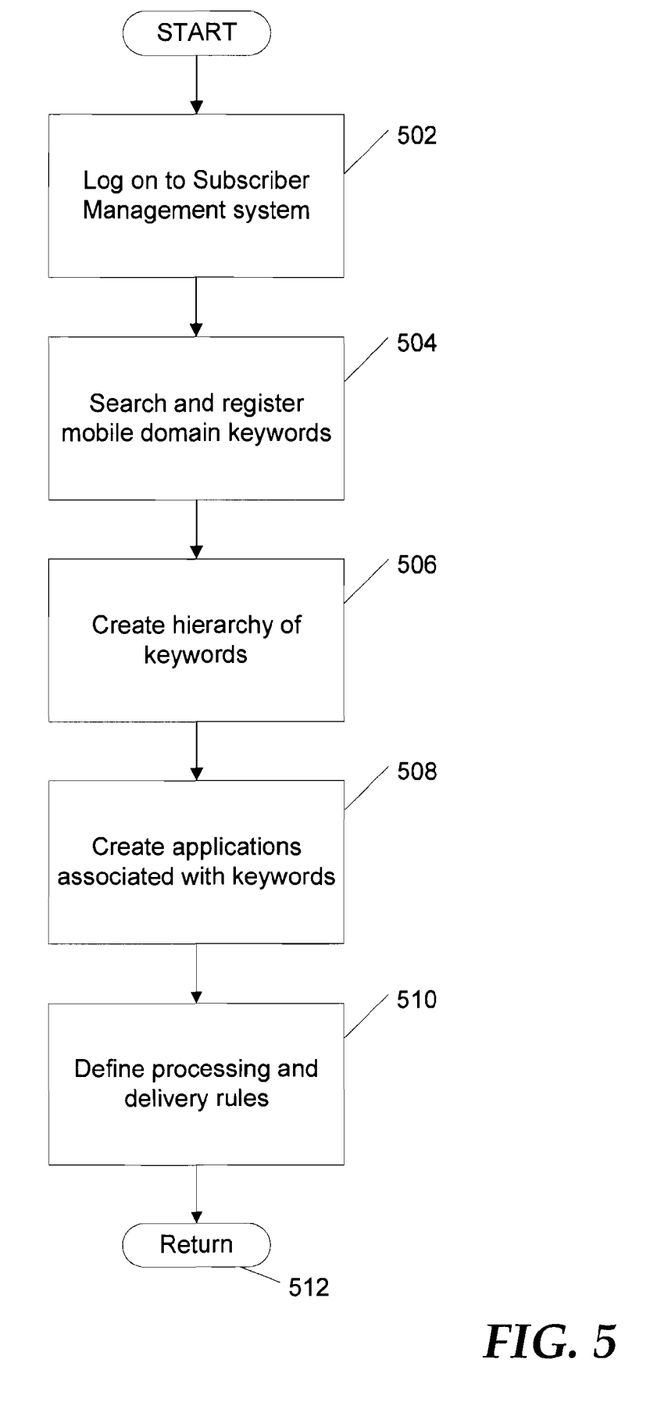
FIG. 5 is a flowchart showing the process for a subscriber to select, register, and define the handling of mobile domain keywords.

FIG. 5 illustrates a flow chart for a general overview of the process for a subscriber to obtain control of a mobile domain key word for a campaign and define how the campaign is managed by the mobile domain platform. Moving from a start block, the process steps to block 502 where the subscriber logs onto the subscriber management component of the mobile domain platform. At block 504, the process enables the subscriber to search for mobile domain keywords that are available for registration. The subscriber can also register a selected mobile domain keyword for a campaign associated with the subscriber.

Moving to block 506, the process enables the subscriber to create and define a hierarchy of one or more keywords, which is based on a root mobile domain keyword that is registered to the subscriber. Stepping to block 508, the process enables the subscriber to create and define one or more custom applications and/or configure defined actions for provided applications that process received text messages that include the registered mobile domain keyword. Advancing to block 510, the process enables the subscriber to create custom rules or configure provided rules that define the processing by defined custom and/or provided applications for text message content that includes the registered keyword. The subscriber is also enabled to create and define custom delivery rules and custom delivery mechanisms for text message content that includes the registered keyword. The subscriber can also define provided delivery rules and provided delivery mechanisms for text message content that includes the registered keyword. Next, the process returns to performing other actions.

Figure 6:
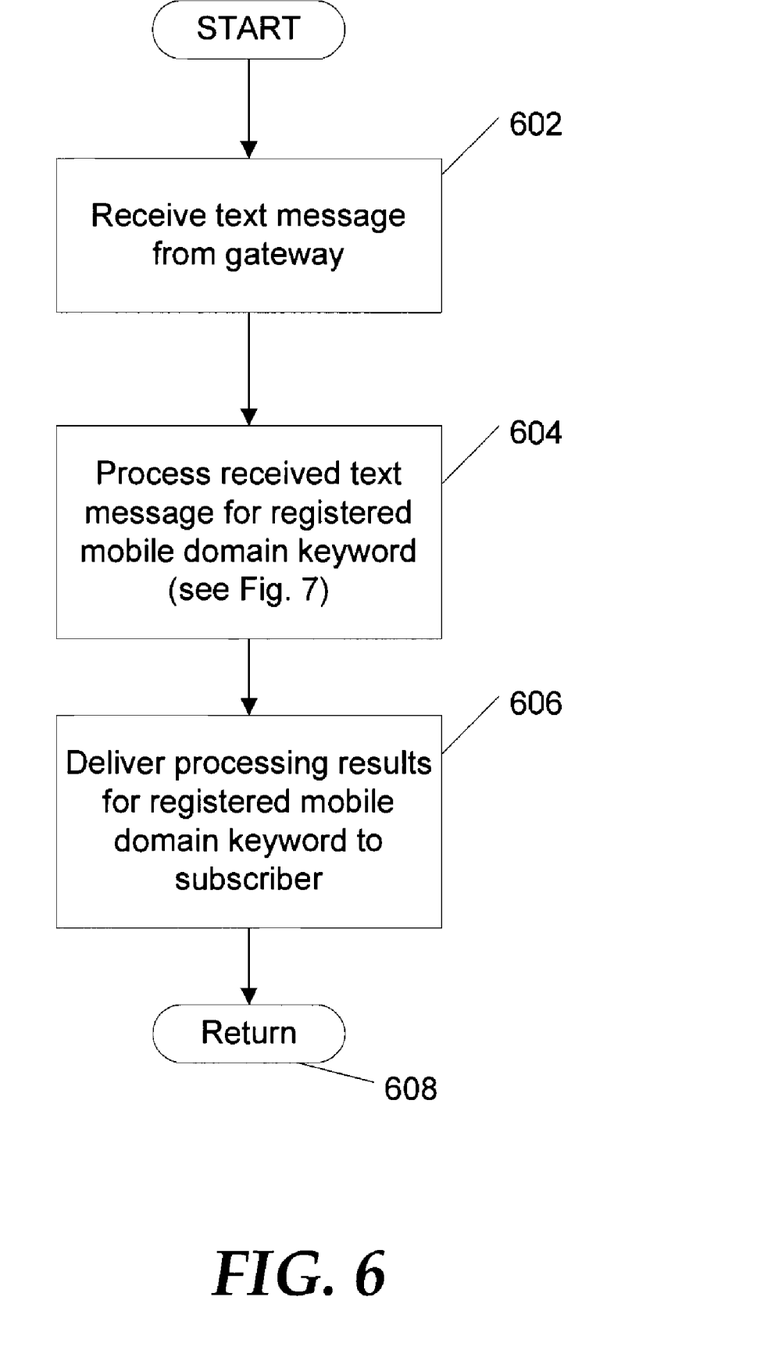
FIG. 6 is a flowchart showing the process for handling a text message that includes a registered mobile domain keyword.

FIG. 6 illustrates a flow chart for a general overview of the process for the mobile domain platform to process received text messages that include mobile domain keywords registered to a subscriber. Moving from a start block, the process advances to block 602 where a text message from a user is received by the mobile domain platform from a gateway. The text message was sent by a user to a mobile number (short code or otherwise) that corresponds to the mobile domain platform. At block 604, the mobile domain platform processes the received text message to identify registered mobile domain keywords. If so, the platform employs applications and rules to process the content of the received text message that includes the registered mobile domain keyword. Advancing to block 606, the process provides the results of the mobile domain platform processing to the subscriber based on one or more delivery actions previously defined by the subscriber. Next, the process moves to performing other actions.

Figure 7:
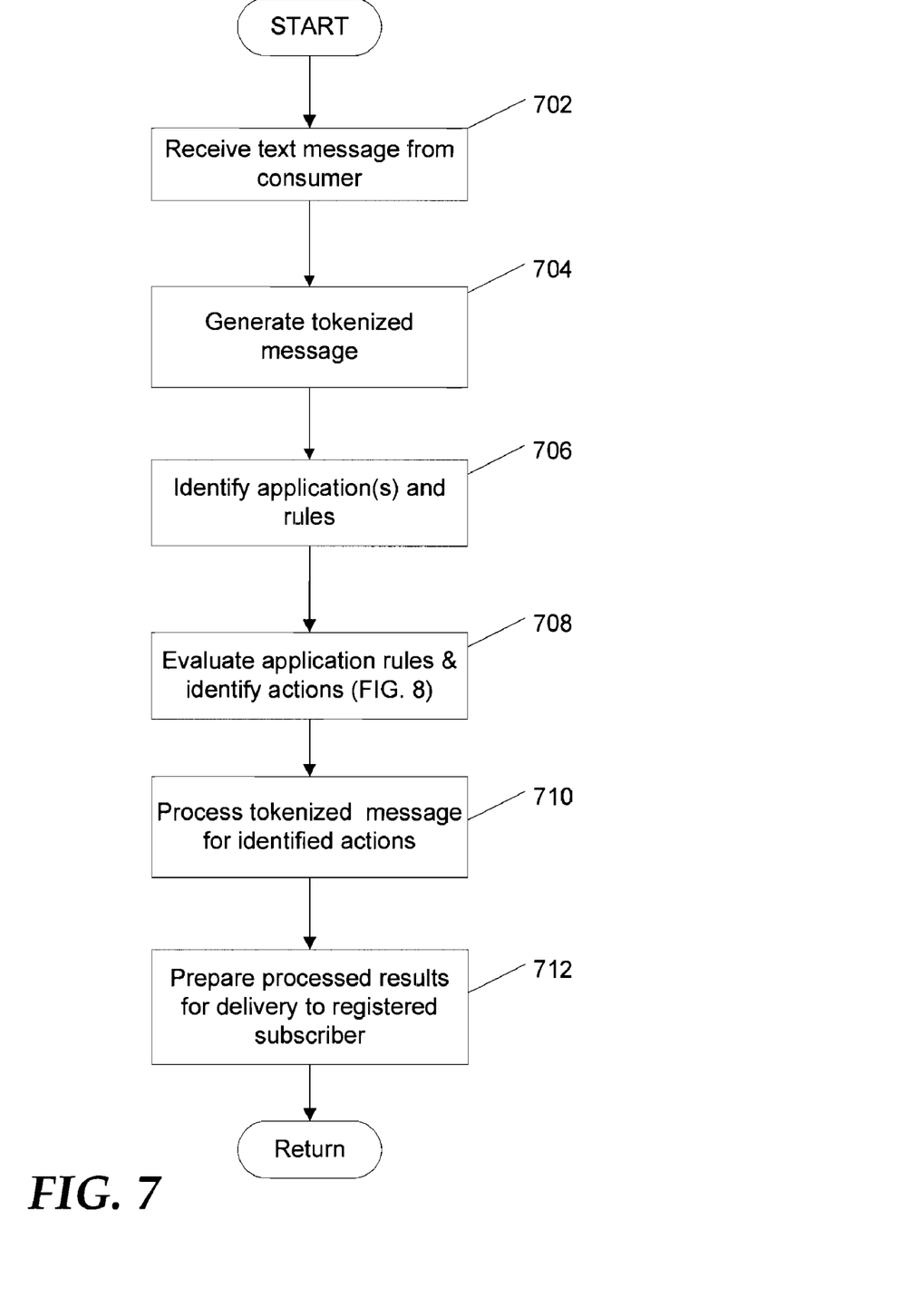
FIG. 7 is a flowchart showing how the processing of a received text message that includes a registered mobile domain keyword.

FIG. 7 illustrates another flow chart that shows a general overview of the processing of a received text message that includes at least one mobile domain keyword registered to a subscriber. Moving from a start block, the process flows to block 702 where the text message that includes at least one mobile domain keyword registered to a subscriber is received by the mobile domain platform. At block 704, the contents and information associated with the received text message is parsed and filtered into one or more tokens.

Advancing to block 706, one or more applications for processing the tokens are identified. At block 708, the rules for invoking the applications are evaluated and actions are identified. Flowing to block 710, the tokenized text message is process in accordance with the identified actions, rules, and applications. Moving to block 712, the results of the processing is prepared and arranged in a format that can be provided to the registered subscriber by one or more defined delivery actions and delivery mechanisms. Next, the process returns to performing other actions.

Figure 8:
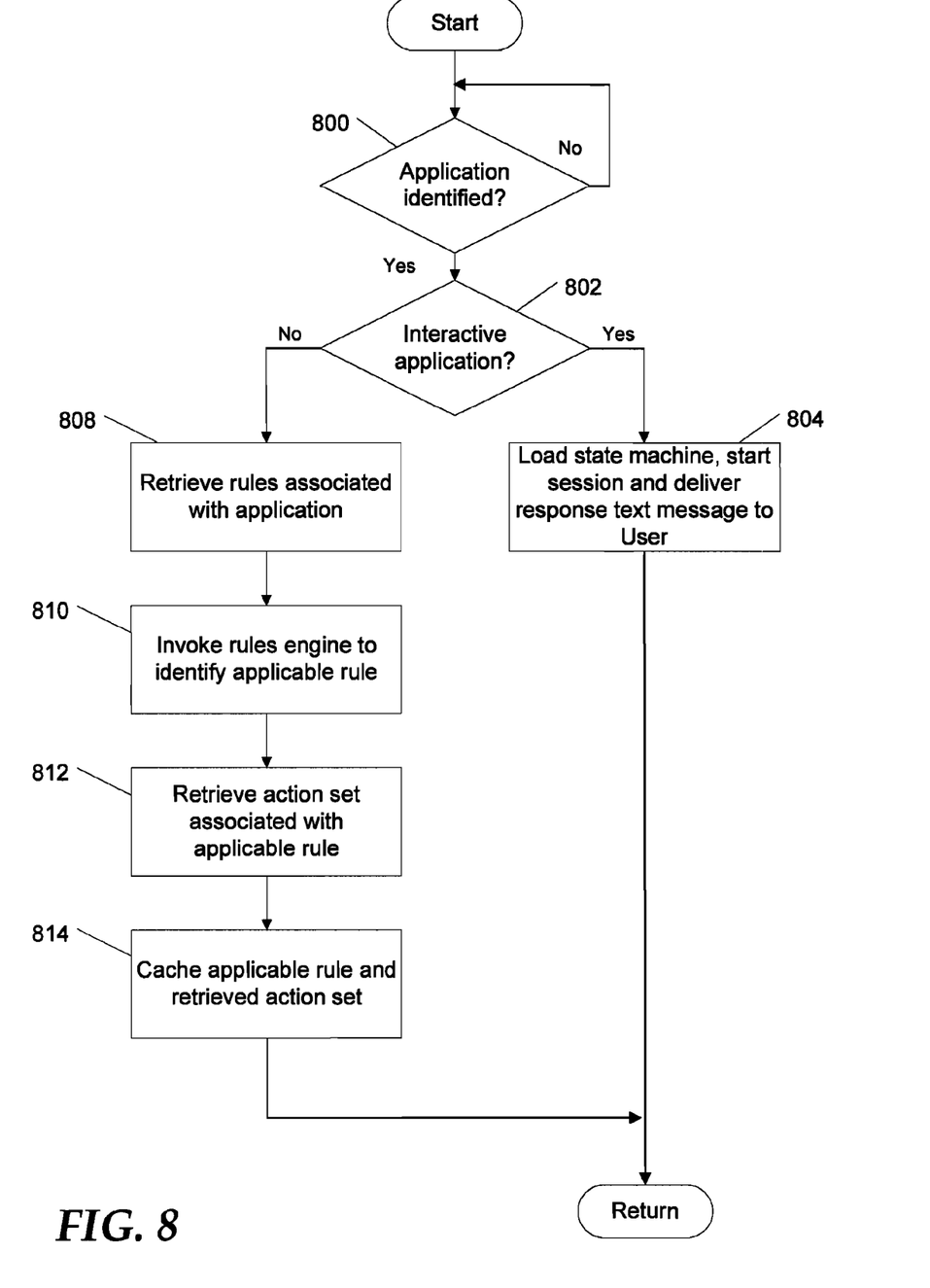
FIG. 8 is a flowchart showing the processing of interactive and non-interactive applications that process registered mobile domain keywords included in a text message received from a user, in accordance with the invention.

FIG. 8 illustrates another flow chart that shows a general overview of the evaluation of applications, rules, and actions that correspond to a subscriber that controls the registration of a mobile domain keyword included in a received text message. Moving from a start block, the process flows to decision block 800 where a determination is made as to whether an application is identified that corresponds to a registered mobile domain keyword. If not, the process loops until true. However, once such an application is identified, the process moves to decision block 802 where a determination is made as to whether the application is interactive. If true, the process steps to block 804 where a state machine is loaded and a session is started for interacting with the user that sent the text message whose contents include a registered mobile domain keyword. Also, a response text message is sent by the mobile domain platform to the user. Next, the process returns to processing other actions as the state machine continues to handle the communication of text messages with the user.

Alternatively, if the determination at decision block 802 indicates that the application is not interactive, the process flows to block 808 were rules associated with the evaluation of the application are identified. At block 810, a rules engine is invoked to identify the particular rule that is applicable for evaluating the application in view of the content of the text message. Flowing to block 812, the process retrieves the set of actions associated with the applicable rule for enabling at least one application to process the text message content. Advancing to block 814, the applicable rule, and set of actions are cached. Next, the process returns to performing other actions.

It will be understood that each block of the above flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustrations support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

What is claimed as new and desired to be protected by Letters Patent of the United States is:

1. A method for managing text messages communicated between a user of a mobile device and a corresponding subscriber to a platform, comprising:

receiving, by the platform, each text message sent by the user to a mobile number that is registered at the platform, wherein the user is distinct from the corresponding subscriber;

extracting keywords included in each text message and determining whether at least one of the extracted keywords is registered as a root to the corresponding subscriber in the platform's database and corresponds to the mobile number and identifying extracted keywords that are recognized by the platform but unregistered to the corresponding subscriber;

processing, by the platform, content included in each text message that includes the registered keyword sent by the user to the corresponding mobile number;

recognizing at least one combination of the registered keyword and an other keyword that is unregistered to the corresponding subscriber;

separately processing the content included in each text message with the at least one combination of the registered keyword and the other keyword that is unregistered to the corresponding subscriber in accordance with rules predetermined by the corresponding subscriber; and delivering, in accordance with delivery rules predetermined by the corresponding subscriber, to the corresponding subscriber at least one result from processing the content included in each text message that includes the at least one combination of the registered keyword and the other keyword, wherein the delivering includes defining, by the corresponding subscriber, one or more delivery mechanisms configured to deliver the at least one result to the corresponding subscriber.

2. The method of claim 1, further comprising enabling the corresponding subscriber to search for at least one available keyword and register the at least one available keyword with the platform;

enabling the corresponding subscriber to define at least one application for processing each received text message that includes at least one keyword registered to the corresponding subscriber; and enabling the corresponding subscriber to define at least one rule for processing each received text message that includes at least one keyword registered to the corresponding subscriber.

3. The method of claim 1, further comprising:
enabling the corresponding subscriber to create at least one custom application for processing each received text message that includes at least one keyword registered to the corresponding subscriber; and
enabling the corresponding subscriber to create at least one custom rule for processing each received text message that includes at least one keyword registered to the corresponding subscriber.

4. The method of claim 1, wherein the other keyword that is unregistered to the corresponding subscriber is predetermined by the corresponding subscriber.

5. The method of claim 1, further comprising:
enabling the corresponding subscriber to customize the one or more delivery mechanisms for delivering the result from processing content included in at least one text message; and
enabling the corresponding subscriber to customize the one or more delivery rules for the delivery mechanism, wherein the delivery mechanism includes at least one of a telephone call, email, alert, Instant Messaging (IM), Really Simple Syndication (RSS) feed, File Transfer Protocol (FTP), Short Message Service (SMS), Multimedia Message Service (MMS), chat, or web page update.

6. The method of claim 1, further comprising sending another text message as a response to the user from at least one of the corresponding subscriber and the platform, wherein content of the response text message is based at least in part on the result of processing the received text message from the user.

7. The method of claim 1, further comprising:
enabling the corresponding subscriber to define a domain based on at least one keyword registered to the corresponding subscriber, wherein the corresponding subscriber identifies the registered keyword as a root for the domain;
enabling the corresponding subscriber to define a hierarchy of at least one sub-domain based on at least one other keyword arranged in a combination with the root keyword; and
enabling the corresponding subscriber to separately define the processing of each sub-domain based on text message content that includes at least the sub-domain defined by the combination of the root registered keyword and the at least one other keyword.

8. The method of claim 7, further comprising
enabling the corresponding subscriber to define at least one application for processing each received text message that includes the sub-domain defined by at least the combination of the root registered keyword and the at least one other keyword; and
enabling the corresponding subscriber to define at least one rule for processing each received text message that includes the sub-domain defined by at least the combination of the root registered keyword and the at least one other keyword.

9. The method of claim 1, further comprising:
aggregating each result of the processing with a previous result of other text messages that include the registered keyword; and
delivering the aggregate to the corresponding subscriber in a batch delivery.

10. The method of claim 1, wherein the mobile number is at least one of a short code mobile number or a full length mobile number that corresponds to the platform, wherein at least one gateway is enabled to communicate received text messages to the platform based at least in part on the mobile number.

11. The method of claim 1, further comprising enabling at least one state machine to manage each response to each subsequent text message received from the user if the processing is defined as interactive.

12. The method of claim 1, further comprising enabling each subscriber to dynamically bid for each instance of the received text message that includes a particular keyword that is available for registration for a campaign.

13. The method of claim 12, wherein the dynamic bidding is further defined by each subscriber for at least one of a period of time or an amount of funds.

14. The method of claim 1, further comprising enabling each subscriber to bid for registering at least one available keyword for a campaign for a period of time.

15. The method of claim 1, further comprising enabling the registered keyword to be included in a result for an online search, wherein the online search result includes at least one instruction to obtain further information by sending at least one text message with the registered keyword to the mobile number that corresponds to the platform.

16. The method of claim 1, further comprising enabling each subscriber that is identified to the platform as an owner of a trademark for an available keyword to be only enabled to register that keyword for a campaign.

17. The method of claim 1, wherein the processed content includes a representation of at least one coupon that is redeemable with the corresponding subscriber.

18. The method of claim 1, further comprising enabling the platform to simultaneously enable actions for at least one of a plurality of subscribers or a plurality of users.

19. The method of claim 1, further comprising:
providing at least one report to the corresponding subscriber regarding the processing of the content included in each text message with at least one keyword registered to the corresponding subscriber; and
enabling the corresponding subscriber to modify the processing of the text message content during a campaign based at least in part on content of a report, wherein each report is provided to the corresponding subscriber in at least of one of real time, periodic, or batch.

20. A system for managing text messages communicated between a user of a client device and a corresponding subscriber, comprising:
a network;
the client device configured to the user to send a text message to a mobile number that is registered at a server, wherein the user is distinct from the corresponding subscriber; and
the server configured to perform:
extracting keywords included in each text message and determining whether at least one of the extracted keywords is registered to the corresponding subscriber as a root in the server's database and corresponds to the mobile number and
identifying extracted keywords that are recognized by the platform but unregistered to the corresponding subscriber;
processing content included in each text message that includes the registered keyword sent by the user to the corresponding mobile number;

recognizing at least one combination of the registered keyword and an other keyword that is unregistered to the corresponding subscriber;

separately processing the content included in each text message with the at least one combination of the registered keyword and the other keyword that is unregistered to the corresponding subscriber in accordance with rules predetermined by the corresponding subscriber; and delivering, in accordance with delivery rules predetermined by the corresponding subscriber, to the corresponding subscriber at least one result from processing the content included in each text message that includes the at least one combination of the registered keyword and the other keyword, wherein the delivering includes defining, by the corresponding subscriber, one or more delivery mechanisms configured to deliver the at least one result to the corresponding subscriber.

21. The system of claim 20, wherein the client device is at least one of a mobile device and a network device.

22. The system of claim 20, wherein the server is configured for:

enabling the corresponding subscriber to search for at least one available keyword and register the at least one available keyword;

enabling the corresponding subscriber to define at least one application for processing each received text message that includes at least one keyword registered to the corresponding subscriber; and enabling the corresponding subscriber to define at least one rule for processing each received text message that includes at least one keyword registered to the corresponding subscriber.

23. The system of claim 20, further comprising:

enabling the corresponding subscriber to create at least one custom application for processing each received text message that includes at least one keyword registered to the corresponding subscriber; and enabling the corresponding subscriber to create at least one custom rule for processing each received text message that includes at least one keyword registered to the corresponding subscriber.

24. The system of claim 20, further comprising enabling the corresponding subscriber to define one or more provided delivery rules for delivering the result from processing content included in at least one text message, wherein the delivery mechanism includes at least one of a telephone call, email, alert, Instant Messaging (IM), Really Simple Syndication (RSS) feed, File Transfer Protocol (FTP), Short Message Service (SMS), Multimedia Message Service (MMS), chat, or web page update.

25. The system of claim 20, further comprising:

enabling the corresponding subscriber to customize the one or more delivery mechanisms for delivering the result from processing content included in at least one text message; and enabling the corresponding subscriber to customize the one or more delivery rules for the delivery mechanism, wherein the delivery mechanism includes at least one of a telephone call, email, alert, Instant Messaging (IM), Really Simple Syndication (RSS) feed, File Transfer Protocol (FTP), Short Message Service (SMS), Multimedia Message Service (MMS), chat, or web page update.

26. The system of claim 20, wherein the server is further configured for enabling the corresponding subscriber to define the one or more delivery mechanism for delivering the result from processing content included in at least one text message as at least one of a telephone call, email, alert, Instant Messaging (IM), Really Simple Syndication (RSS) feed, File Transfer Protocol (FTP), Short Message Service (SMS), Multimedia Message Service (MMS), chat, or web page update.

27. The system of claim 20, wherein the server is configured further for:

enabling the corresponding subscriber to define a domain based on at least one keyword registered to the corresponding subscriber, wherein the corresponding subscriber identifies the registered keyword as a root for the domain;

enabling the corresponding subscriber to define a hierarchy of at least one sub-domain based on at least one other keyword arranged in a combination with the root keyword; and enabling the corresponding subscriber to separately define the processing of each sub-domain based on text message content that includes at least the sub-domain defined by the combination of the root registered keyword and the at least one other keyword.

28. The system of claim 27, wherein the server is configured further for:

enabling the corresponding subscriber to define at least one application for processing each received text message that includes the sub-domain defined by at least the combination of the root registered keyword and the at least one other keyword; and enabling the corresponding subscriber to define at least one rule for processing each received text message that includes the sub-domain defined by at least the combination of the root registered keyword and the at least one other keyword.

29. The system of claim 20, wherein the mobile number is at least one of a short code mobile number or a full length mobile number that corresponds to the server, wherein at least one gateway is enabled to communicate received text messages to the server based at least in part on the mobile number.

30. The system of claim 20, wherein the server is configured further for enabling each subscriber to dynamically bid for each instance of the received text message that includes a particular keyword that is available for registration for a campaign.

31. The system of claim 30, wherein the dynamic bidding is further defined by each subscriber for at least one of a period of time or an amount of funds.

32. The system of claim 20, further comprising enabling each subscriber to bid for registering at least one available keyword for a campaign for a period of time.

33. The system of claim 20, wherein the server is configured further for enabling the registered keyword to be included in a result for an online search, wherein the online search result includes at least one instruction to obtain further information by sending at least one text message with the registered keyword to the mobile number that corresponds to the server.

34. The system of claim 20, wherein the processed content includes a representation of at least one coupon that is redeemable with the corresponding subscriber.

35. The system of claim 20, the server is configured to simultaneously enable actions for at least one of a plurality of subscribers or a plurality of users.

36. The system of claim 20, further comprising:

providing at least one report to the corresponding subscriber regarding the processing of the content included in each text message with at least one keyword registered to the corresponding subscriber; and enabling the corresponding subscriber to modify the processing of the text message content during a campaign based at least in part on content of a report, wherein each report is provided to the corresponding subscriber in at least of one of real time, periodic, or batch.

37. A processor executable non-transitory storage media that includes data for managing text messages communicated between a user of a mobile device and a corresponding subscriber to a platform, wherein the execution of the data enables actions, comprising:

receiving, by the platform, each text message sent by the user to a mobile number that is registered at the platform, wherein the user is distinct from the corresponding subscriber;

extracting keywords included in each text message and determining whether at least one of the extracted keywords is registered as a root to the corresponding subscriber in the platform's database and corresponds to the mobile number and identifying extracted keywords that are recognized by the platform but unregistered to the corresponding subscriber;

processing, by the platform, content included in each text message that includes the registered keyword sent by the user to the corresponding mobile number;

recognizing at least one combination of the registered keyword and an other keyword that is unregistered to the corresponding subscriber;

separately processing the content included in each text message with the at least one combination of the registered keyword and the other keyword that is unregistered as the root to the corresponding subscriber in accordance with rules predetermined by the corresponding subscriber; and delivering, in accordance with delivery rules predetermined by the corresponding subscriber, to the corresponding subscriber at least one result from processing the content included in each text message that includes the at least one combination of the registered keyword and the other keyword, wherein the delivering includes defining, by the corresponding subscriber, one or more delivery mechanisms configured to deliver the at least one result to the corresponding subscriber.

38. A server for managing text messages communicated between a user of a mobile device and a corresponding subscriber, comprising:

a processor;

a first component configured to communicate over a network;

a second component configured to receive, by a platform, each text message sent by the user to a mobile number that is registered at a platform, wherein the user is distinct from the corresponding subscriber;

a third component configured to extract keywords included in each text message and determining whether at least one of the extracted keywords is registered as a root to the corresponding subscriber in the platform's database and corresponds to the mobile number and identifying extracted keywords that are recognized by the platform but unregistered to the corresponding subscriber;

a fourth component configured to process for, at the platform, content included in each text message that includes the registered keyword sent by the user to the corresponding mobile number;

a fifth component configured to recognize at least one combination of the registered keyword and an other keyword that is unregistered to the corresponding subscriber;

a sixth component configured to separately process the content included in each text message with the at least one combination of the registered keyword and the other keyword that is unregistered as the root to the corresponding subscriber in accordance with rules predetermined by the corresponding subscriber; and a seventh component configured to deliver, in accordance with delivery rules predetermined by the corresponding subscriber, to the corresponding subscriber at least one result from processing the content included in each text message that includes the at least one combination of the registered keyword and the other keyword, wherein the delivering includes defining, by the corresponding subscriber, one or more delivery mechanisms configured to deliver the at least one result to the corresponding subscriber.

* * * * *